April 30, 1957  S. P. MALONE ET AL  2,790,659
SHOCK ABSORBER END MOUNTING
Filed Sept. 29, 1954  3 Sheets-Sheet 1
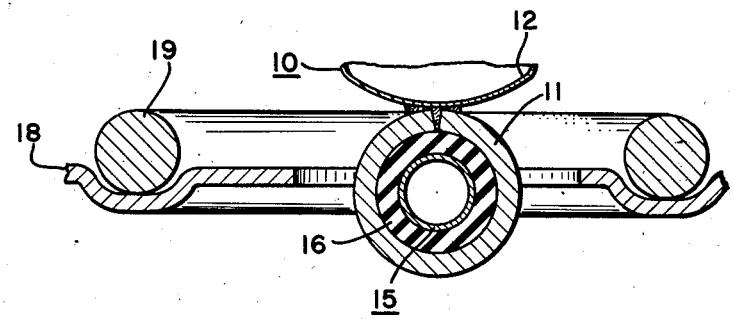
Fig. 4
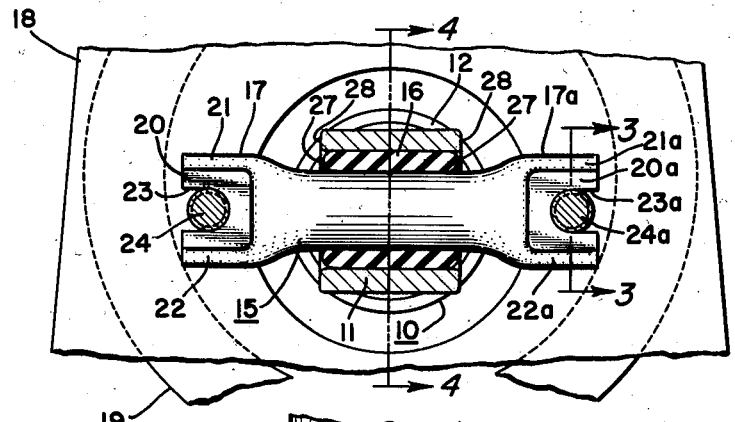
Fig. 2
Fig. 3
Fig. 1
INVENTORS
Stephen P. Malone
By Paul J. Long, Jr.
Craig V. Morton
His Attorney

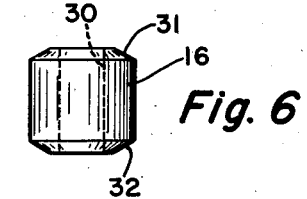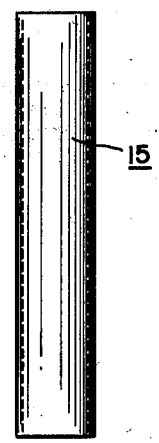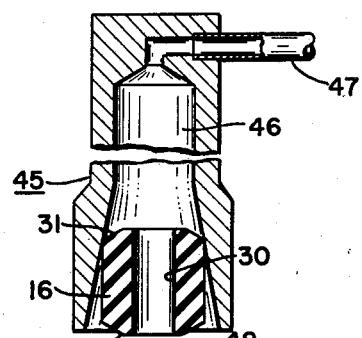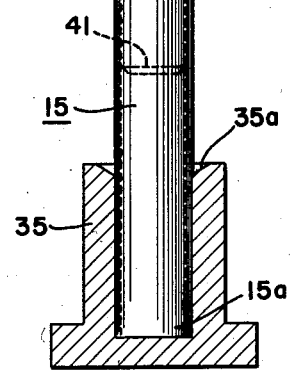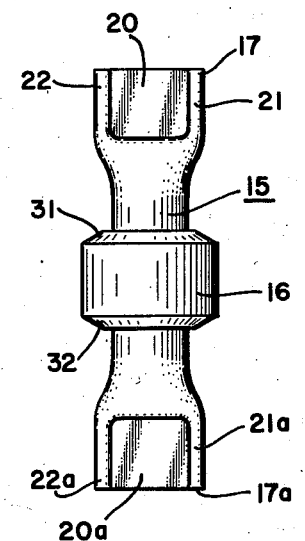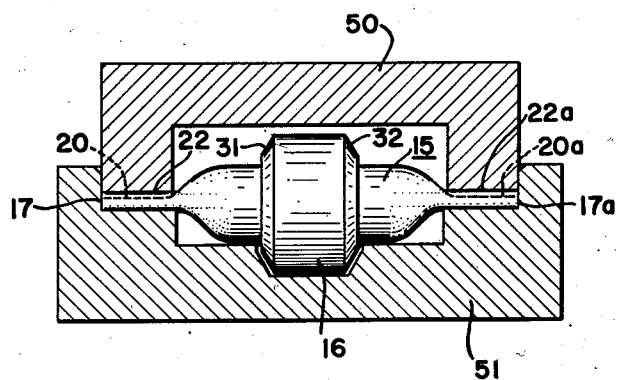

INVENTORS
Stephen P. Malone
Paul J. Long, Jr.
By Craig V. Monton
His Attorney

United States Patent Office 2,790,659
Patented Apr. 30, 1957

2,790,659

SHOCK ABSORBER END MOUNTING

Stephen P. Malone and Paul J. Long, Jr., Dayton, Ohio, assignors to General Motors Corporation, Detroit, Mich., a corporation of Delaware Application September 29, 1954, Serial No. 459,095

9 Claims. (Cl. 287—85)

This invention relates to an end mounting structure particularly adapted for use on a shock absorber to mount one end of a shock absorber on a motor vehicle. The invention also relates to a method of manufacturing the end mounting for the shock absorber.

An object of the invention is to provide an end mounting for a shock absorber of a simplified structure wherein a mounting stud is positioned within an eye carried on the shock absorber with a resilient rubber-like sleeve maintained under radial compression disposed between the mounting stud and the eye.

Another object of the invention is to provide a method of simplifying the manufacture of a shock absorber end mounting of the type set forth in the foregoing objects.

Another object of the invention is to provide a method of manufacturing an end mounting for a shock absorber in which a stud is positioned within an eye and retained therein by radial compression of a resilient rubber-like bushing wherein the rubber bushing is assembled upon the stud and the stud is formed to a finished state after assembly of the rubber bushing on it and before assembly of the bushing and stud into the eye.

Further objects and advantages of the present invention will be apparent from the following description, reference being had to the accompanying drawings wherein a preferred form of the invention is clearly shown.

In the drawings:

Figure 1 is a vertical cross sectional view of a shock absorber end mounting of this invention as applied to a spring seat for a motor vehicle.

Figure 2 is a bottom view of the structure shown in Figure 1, partially in cross section, taken substantially along line 2—2 of Figure 1.

Figure 3 is a transverse cross sectional view taken along line 3—3 of Figure 2.

Figure 4 is a transverse cross sectional view taken along line 4—4 of Figure 2.

Figure 5 is an end view of the resilient rubber-like bushing incorporated in the shock absorber end mounting.

Figure 6 is a side view of the bushing of Fig. 5.

Figure 7 is an elevational view of the mounting stud ready for assembly of the bushing of Figures 5 and 6 thereon.

Figure 8 is a schematic illustration of the method of assembling the resilient rubber-like bushing of Figures 5 and 6 on the stud of Figure 7.

Figure 9 is an elevational view of the product resulting from the method step of Figure 8.

Figure 10 is a schematic view of the method step of forming opposite ends of the stud of Figure 7 after the assembly operation of Figure 8.

Figure 11 is an elevational view illustrating the product resulting from the method step of Figure 10.

Figure 13:
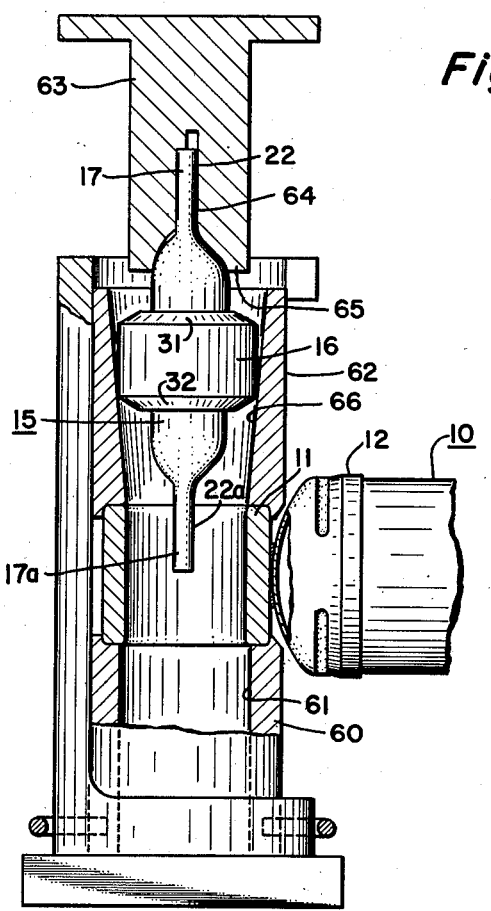
Figure 13 is a schematic cross sectional view of an apparatus for performing the method step of assembling the product illustrated in Figure 12 into the mounting eye attached on the end of a shock absorber body.

In Figures 1–4 inclusive there is illustrated an end mounting for a shock absorber as applied to a spring seat for a motor vehicle by which one end of a shock absorber body is attached to the spring seat. The shock absorber 10 illustrated in Figure 1 may be of any conventional direct acting type of shock absorber in which one end of the body of the shock absorber is secured to one part of a vehicle and an actuating rod extends from the shock absorber that is attached to another part of the vehicle whereby the parts are allowed relative movement but the movement is damped by the action of the shock absorber.

As shown in Figure 1 the shock absorber 10 has a mounting eye 11 welded to the cap 12 of the shock absorber. The eye 11 is in the form of an annulus, as shown in Figure 4. Preferably, to reduce the cost of manufacture, the eye 11 is formed of strip steel stock bent into the form of the annulus shown and welded to the shock absorber 10.

A mounting stud 15 in the form of a hollow tube, as shown in Figures 1 and 4 is positioned axially within the mounting eye 11. Between the mounting stud 15 and the eye 11 there is disposed a rubber-like bushing 16 that is maintained under radial compression between the external periphery of the stud 15 and the internal periphery of the eye 11 to provide for securing the stud 15 within the eye 11. Preferably, the frictional component between the surface of the bushing 16 and the stud and eye 15 and 11 is sufficiently high to prevent any axial movement between the stud and the eye without requiring any special bonding operation to be performed to bond the resilient rubber-like bushing 16 to the peripheries of the stud and eye.

The stud 15 has its opposite ends 17 and 17a formed to a flattened condition to provide mounting platforms by which the stud 15 is secured to a spring seat 18 that supports the coil spring 19 that in turn supports the motor vehicle.

The ends 17 and 17a of the stud 15 are flattened to provide the flat platform area 20 and 20a with flanged edges 21 and 22 projecting normal to the plane of the platforms 20 and 20a and parallel to the axis of the stud.

The flattened ends 17 and 17a of the stud 15 have a width that is greater than the diameter of the stud 15 but less than the internal diameter of the eye 11 to provide for assembly of the stud 15 into the eye 11 in a manner hereinafter described.

The platform area 20 and 20a have notches 23 and 23a respectively therein extending inwardly from the end extremities of the stud. These notches 23 and 23a receive mounting bolts 24 and 24a respectively by which the stud 15 is secured to the spring seat 18, suitable nuts 25 and 25a cooperating with the bolts 24 and 24a for this purpose.

The ends 17 and 17a of the stud 15 are flat formed beyond the end extremities of the bushing 16 so that the exterior periphery of the stud 15 within the bushing 16 and within the eye 11 conforms to the internal periphery of the eye 11 and thereby maintains the bushing 16 therebetween under uniform radial compression from end to end thereof.

As illustrated in Figure 2, the bushing 16 has its axial end extremities 27 disposed within the axial end extremities 28 of the eye 11.

In Figures 5–14 inclusive there is illustrated the method of manufacturing the end mounting for the shock absorber disclosed in Figures 1-4.

It is preferable, in the manufacture of shock absorbers, to have the mounting eye 11 welded to the cap 12 of the shock absorber 10 prior to assembly operations of the shock absorber as the welding heat would seriously effect the operating elements of the shock absorber should the eye 11 be welded to the shock absorber after assembly of the actuating parts therein.

Also, it is desirable that the mounting stud 15 be manufactured to its finished condition prior to assembly of the stud 15 into the mounting eye 11. However, this has occasioned certain manufacturing difficulties because of the need for the flattened mounting platforms 20 and 20a on the ends of the stud 15. This has resulted in a rather serious problem of assembly of the rubber-like bushing 16 upon the stud 15, particularly in view of the fact that it is necessary to expand the bushing 16 over the stud 15 to obtain a satisfactory frictional component between the stud and the bushing that will prevent axial movement of the stud in the bushing when the bushing and stud assembly are positioned within the mounting eye 11 with the bushing 16 under radial compression between the eye and the mounting stud.

In Figures 5 and 6 there is illustrated the free form of the rubber-like mounting bushing 16 prior to its assembly upon the mounting stud illustrated in Figure 7. The bushing 16 is in the form of an annulus with an axial opening 30. The ends of the bushing 16 are provided with tapered surfaces 31 and 32 that prevent too great an expansion of the bushing when it is under radial compression between the stud 15 and the eye 11 as shown in Figure 2. In the free form, the resilient rubber-like bushing 16 has the internal diameter 30 thereof less than the exterior diameter of the stud 15, shown in true cylindrical form in Figure 7. The external diameter of the bushing 16, in its free form is less than the internal diameter of the eye 11.

In the first step in the method of assembling the shock absorber end mounting of this invention the bushing 16 of Figures 5 and 6 is adapted to be placed upon the cylindrical tubular stud 15 as shown in Figure 7.

As illustrated in Figure 8, the cylindrical tubular mounting stud 15 of Figure 7 is positioned within a support member 35, the lower end 15a of the stud 15 being inserted into the support member 35 a sufficient distance that the upper end 35a of the support member 35 acts as a stop to limit the movement of the bushing 16 downwardly onto the stud 15 so as to dispose the bushing 16 intermediate opposite ends of the stud 15, as shown in Figure 9.

The upper end of the stud 15 supports an expanding fixture 40 having a reduced diameter portion 41 that fits into the upper end of the stud 15 and a still smaller reduced diameter portion 42 of substantially the internal diameter of the axial opening 30 of the bushing 16 that is supported in the press member 45. A gradually expanding section 43 connects the reduced diameter portion 42 of the expander 40 with the external diameter of the stud 15 so that when the press member 45 causes the bushing 16 to be moved downwardly upon the expander 40 the internal bore 30 of the bushing will be expanded to cause it to slide upon the external diameter of the mounting stud 15. To aid in expansion of the bushing 30 air under pressure is supplied to the chamber 46 in the press member 45 through a suitable supply line 47. The reduced diameter portion 42 of the expander 40 has an axial bore 48 connecting with one or more radial bores 49 by which air under pressure is supplied between the expander and the bushing at the time it is given its initial expansion on its movement downward ove rthe expanding surface 43 of the expander 40.

To aid in placement of the bushing 30 upon the mounting stud 15, and to reduce friction therebetween during the assembly operation, a suitable lubricant may be applied to the bushing 16 and the mounting stud 15.

In Figure 9 there is illustrated the product that results from the method step performed by the apparatus of Figure 8 wherein the rubber-like bushing 16 is now positioned on the external periphery of the mounting stud 15. It will be noted that the assembly operation has been performed at a time when the bushing and the mounting stud are of uniform diameters to obtain the simplest assembly operation for placement of the bushing on the stud. At this time the external diameter of the bushing 16 has been expanded to an extent that it is larger than the internal diameter of the eye 11 that will receive the expanded bushing. After the assembly operation is performed by the apparatus of Figure 8, the lubricant applied to the stud 15 and the bushing 16 can be removed by a suitable washing operation.

Subsequent to the assembly operation that produces the product shown in Figure 9, the assembled stud and bushing is placed between forming dies 50 and 51, shown in Fig. 10, to flatten and form the opposite ends of the mounting stud 15 whereby the ends of the stud are given the configuration shown in Figures 11 and 3. In this operation the ends of the mounting stud 15 are flattened transversely of the axis of the stud to an extent that the width of the flattened ends is greater than the diameter of the stud but is less than the internal diameter of the mounting eye 11 that is adapted to receive the stud assembly.

Figure 12:
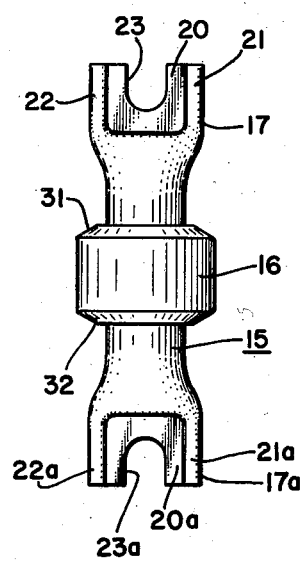
Figure 12 is an elevational view of the mounting stud of Figure 11, illustrating the same after the method step of providing slots in the formed ends of the product of Figure 11.

In Figure 12 there is illustrated the product formed by a stop in the manufacture by which the slots 23 and 23a are produced in the platform area 20 and 20a of the ends 17 and 17a of the stud 15. Upon completion of the operation resulting in the product illustrated in Figure 12, the mounting stud 15 is ready for use in the mounting of the shock absorber on the spring seat as shown in Figure 1.

In Figure 13 there is illustrated apparatus for performing the method step of inserting the stud assembly of Fig. 12 into the eye 11 welded on the end of the shock absorber 10.

In the apparatus of Figure 13 the eye 11 is supported upon a support member 60 having an internal bore 61. Further, a clamping member 62 is positioned upon the opposite edge of the eye 11. The stud assembly illustrated in Figure 12 is carried in a press member 63 that has a chambered recess 64 that conforms to the contour of the end 17 of the stud 15.

Figure 14:
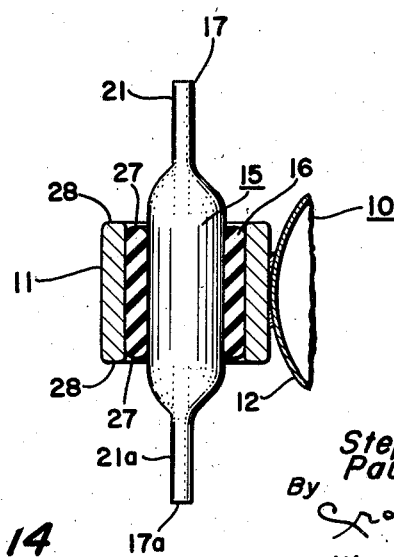
Figure 14 is a cross sectional view illustrating the product resulting from the method step of Figure 13.

The bushing 16 moves within a tapered chamber 66 provided in the support member 62 by which the external diameter of the bushing 16 is compressed and forced into the internal diameter of the eye 11 as the stud and bushing assembly is moved axially through the eye 11. Since the end 17a of the stud 15 has a transverse dimension slightly less than the eye 11 it will lead the stud assembly through the eye followed by the bushing 16 with concurrent compression of the bushing 16 in the axial movement thereof into the eye 11. Suitable lubricant is provided to reduce the friction component between the bushing 16 and the tapered chamber 66 and the eye 11 during assembly of the stud and bushing assembly into the eye. The positioning of the product assembly of Figure 12 resulting from the operation performed in Figure 13 is shown in Figure 14 with the stud assembly 15 being confined under radial compression between the stud 15 and the eye 11.

While the form of embodiment of the invention as herein disclosed constitutes a preferred form, it is to be understood that other forms might be adopted as may come within the scope of the claims which follow.

What is claimed is as follows:

1. A shock absorbed end mounting, comprising, a mounting eye in the form of an annulus attachable to one end of a shock absorber, a cylindrical tubular stud of less external diameter than the internal diameter of said eye and of an axial length greater than the axial length of said eye, said stud being disposed axially in said eye by a rubber bushing sleeve in the form of an annulus radially compressed between said stud and said eye with said bushing on said stud intermediate the ends thereof and said stud projecting beyond said bushing and said eye, said stud having opposite ends thereof flattened transversely of the axis of the stud beyond the end extremities of said eye and having a transverse width transversely of the axis of the stud and in the plane of the flattened end that is less than the internal diameter of the eye but greater than the external diameter of the stud whereby to provide for assembly of the stud into the eye axially, the said flattened ends of said stud having edge flanges normal to the plane of the flattened ends and parallel to the axis of the stud.

2. A shock absorber end mounting, comprising, a mounting eye in the form of an annulus attachable to one end of a shock absorber, a cylindrical tubular stud of less external diameter than the internal diameter of said eye and of an axial length greater than the axial length of said eye, said stud being disposed axially in said eye by a rubber bushing sleeve in the form of an annulus radially compressed between said stud and said eye with said bushing on said stud intermediate the ends thereof and said stud projecting beyond said bushing and said eye, said stud having opposite ends thereof flattened transversely of the axis of the stud beyond the end extremities of said eye and having a transverse width transversely of the axis of the stud and in the plane of the flattened end that is less than the internal diameter of the eye but greater than the external diameter of the stud whereby to provide for assembly of the stud into the eye axially, the said flattened ends of said stud having edge flanges normal to the plane of the flattened ends and parallel to the axis of the stud, the said flattened ends also each including a slot extending inwardly from the outer extremity thereof parallel to the axis of the stud and adapted for receipt of a mounting member.

3. A shock absorber end mounting, comprising, a mounting eye attachable on one end of a shock absorber, a hollow stud disposed in said eye, and a rubber-like bushing sleeve between said eye and said stud held under compression thereby therebetween, said stud having the ends thereof flattened transversely of the stud axis to provide a mounting platform having a width transversely of the stud axis that is less than the transverse dimension of the eye taken transversely of the eye axis to permit insertion of the platform end of the stud through the eye, the said flattened ends each having edge flanges normal to the plane of the flattened ends and parallel to the axis of the stud.

4. A shock absorber end mounting, consisting of, a shock absorber having a mounting eye on at least one end of the shock absorber, a hollow longitudinally extending tubular stud disposed in said eye, and a rubber-like bushing sleeve between said eye and said stud held under compression between said eye and stud, said stud being tubular from end to end thereof and having the ends thereof extending axially beyond the ends of said eye and flattened transversely of the stud axis to provide a mounting platform at each end of said eye with a width transversely of the stud axis that is less than the minimum transverse dimension of the eye taken transversely of the eye axis to provide for assembly insertion of the platform end of the stud through the eye.

5. A shock absorber end mounting in accordance with claim 4 in which the sleeve bushing is retained axially immovably between the said stud and the said eye by friction forces resulting from radial compression of the sleeve between the stud and the eye.

6. A shock absorber end mounting in accordance with claim 4 in which the bushing sleeve has an internal periphery defining a cross sectional area less than the cross sectional area of the stud defined by the external periphery thereof and a cross sectional area defined by the external periphery of the sleeve less than the cross sectional area defined by the internal periphery of the eye when the bushing sleeve is in a free state, but with the bushing sleeve having a cross sectional area greater than the cross sectional area defined by the internal periphery of the eye when the bushing sleeve is expanded over the stud.

7. A method of producing an end mounting for an eye member, comprising the steps of, providing a hollow cylindrical tube, sliding a resilient rubber-like bushing thereon in frictional engagement from one end of said tube to a center portion thereof, thereafter flattening opposite ends of said tube beyond the center portion thereof, and inserting the tube and bushing within the eye concurrently effecting radial compression of the bushing to retain assembled relationship.

8. The method of claim 7 in which the step of flattening of the ends of the tube comprises flattening of the ends of the tube beyond the ends of the bushing thereon to increase the width of the ends to provide mounting platforms for the said tube at opposite ends thereof with the side edges of the flattened ends bent normal to the plane of the ends and parallel to the axis of the tube.

9. The method of manufacturing a shock absorber end mounting having a mounting eye of uniform internal diameter, comprising, the steps of, providing a tube hollow from end to end thereof, sliding a resilient rubber-like bushing thereon in frictional engagement from one end of said tube to a center portion thereof, thereafter flattening opposite ends of said tube beyond the center portion thereof to form mounting platforms for the shock absorber end mounting, and inserting the tube and bushing within the shock absorber mounting eye concurrently effecting radial compression of the bushing to retain assembled relationship.

References Cited in the file of this patent
UNITED STATES PATENTS

| | | |
|---|---|---|
| 1,320,695 | King et al. | Nov. 4, 1919 |
| 2,049,024 | Robertson | July 28, 1936 |
| 2,300,013 | Sampson | Oct. 27, 1942 |
| 2,314,505 | McIntyre et al. | Mar. 23, 1943 |
| 2,598,115 | Dodge | May 27, 1952 |
| 2,703,708 | Wagner | Mar. 8, 1955 |